United States Patent [19]

Furomoto

[11] Patent Number: 5,160,099
[45] Date of Patent: Nov. 3, 1992

[54] FISHING REEL WITH SHAFT ALIGNMENT CONSTRUCTION

[75] Inventor: Yoshiyuki Furomoto, Sakai, Japan

[73] Assignee: Shimano Industrial Co., Ltd., Osaka, Japan

[21] Appl. No.: 482,912

[22] Filed: Feb. 22, 1990

[30] Foreign Application Priority Data

Feb. 28, 1989 [JP] Japan .................... 1-23694[U]

[51] Int. Cl.$^5$ ............................ A01K 89/015
[52] U.S. Cl. .................. 242/321; 384/447
[58] Field of Search ........... 242/268, 264, 321, 319; 384/255, 447

[56] References Cited

U.S. PATENT DOCUMENTS

| | | | |
|---|---|---|---|
| 2,691,553 | 10/1954 | Pettigrew | 384/447 |
| 4,035,044 | 7/1977 | Miyazaki | 384/447 |
| 4,232,842 | 11/1980 | Noda | 242/321 |
| 4,569,423 | 2/1986 | Hirano | 384/255 X |
| 4,634,079 | 1/1987 | Furomoto | 242/268 X |
| 4,638,958 | 1/1987 | Furomoto | 242/319 X |
| 4,943,012 | 7/1990 | Aoki | 242/321 X |

Primary Examiner—Katherine Matecki
Attorney, Agent, or Firm—Dickstein, Shapiro & Morin

[57] ABSTRACT

An alignment construction for a rotary shaft of a fishing reel having a reel body, a rotary shaft and a bearing member fixed to the reel body for rotatably supporting the rotary shaft. The bearing member includes an outer peripheral face and an inner peripheral face eccentric relative to the outer peripheral face to permit position adjustment of the bearing member relative to the reel body.

4 Claims, 3 Drawing Sheets

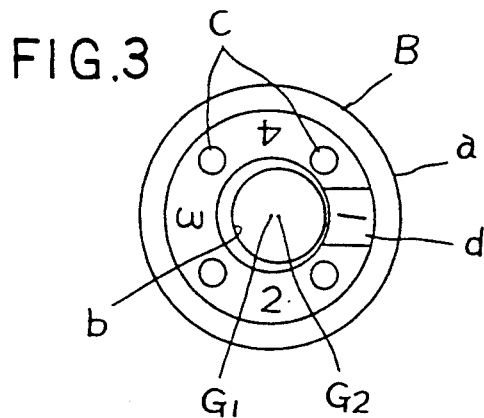
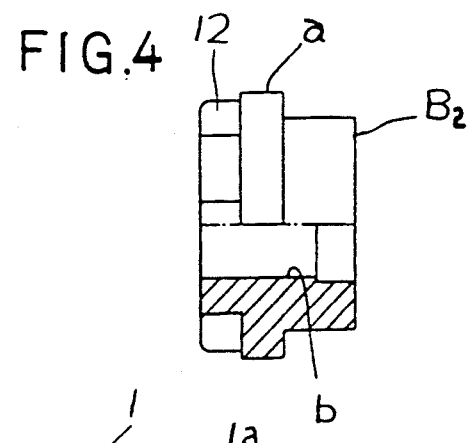
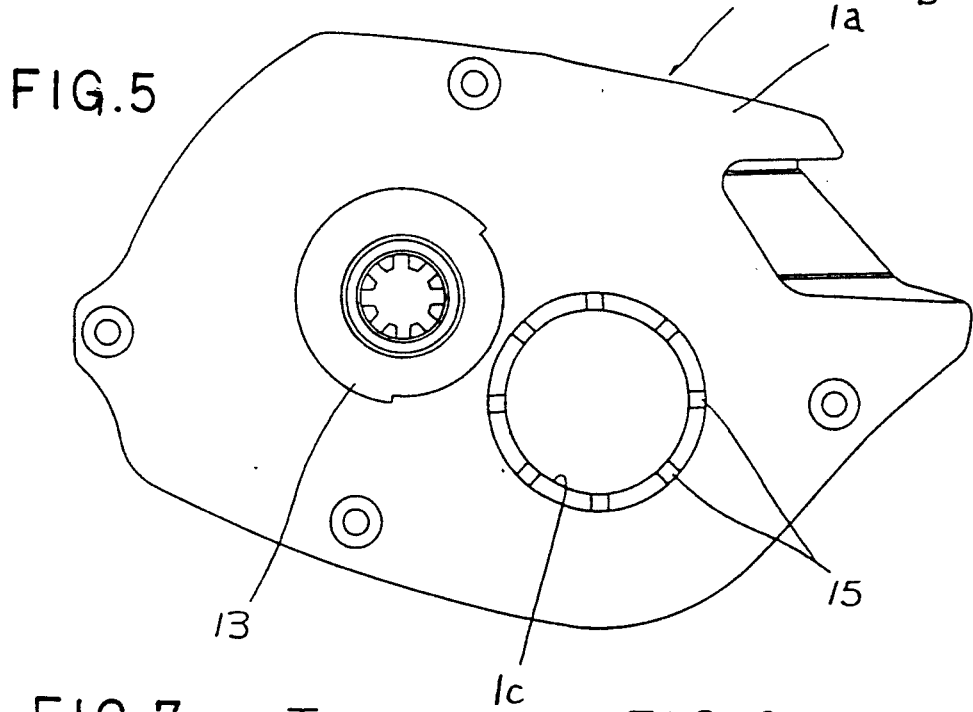
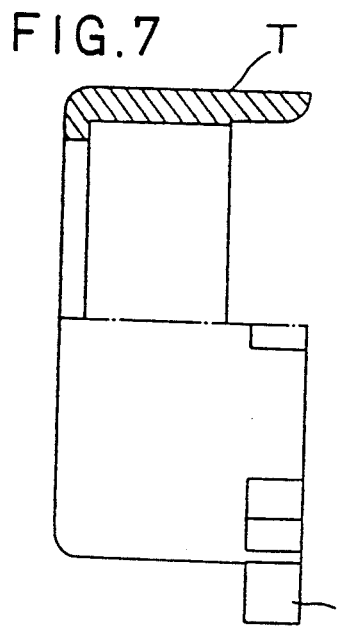
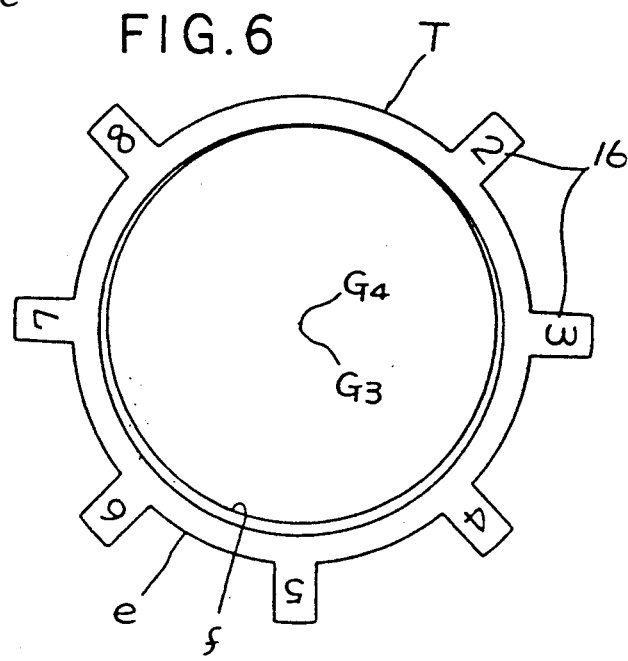

5,160,099

FISHING REEL WITH SHAFT ALIGNMENT CONSTRUCTION

BACKGROUND OF THE INVENTION

1. Field of the Invention

The present invention relates to an alignment construction for a rotary shaft of a fishing reel having a reel body, the rotary shaft and a bearing member.

2. Description of the Related Art

A typical fishing reel is known from a Japanese published utility model gazette No. 60-13359, for example. In this fishing reel, a handle shaft carrying a control handle is rotatably supported to one of a pair of side plates forming a reel body. The handle shaft mounts a main gear. Between the one side plate and the other side plate, there is rotatably supported a spool shaft on which a spool is mounted. The spool shaft carries thereon a pinion gear engageable with the main gear. In operation, as the handle shaft is rotated by a manual rotary operation of the control handle, the spool shaft is driven to rotate through engagement between the main gear and the pinion gear.

In such fishing reel as described above, if the axis of the handle shaft or the spool shaft is erroneously aligned with a shaft receiving hole which often occurs due to inevitable manufacturing tolerances, the erroneous alignment results in deterioration of the meshing engagement between the main gear and the pinion gear, whereby the user often feels unsmoothness in the reel rotation and also uncomfortable rumbling noise caused by the unsmooth rotation.

In view of the above-described problem of the prior art, the primary object of the invention is to provide an improved fishing reel which permits easy adjustment, if necessary, of axis alignment of the handle or spool shaft relative to the its receiving, i.e. bearing hole thereby to eliminate the above problem of the prior art.

SUMMARY OF THE INVENTION

For accomplishing above-noted object, according to the present invention, an alignment construction for a rotary shaft of a fishing reel having a reel body, a rotary shaft and a bearing member fixed to the reel body for rotatably supporting the rotary shaft, wherein the bearing member includes an outer peripheral face and an inner peripheral face eccentric relative to said outer peripheral face to permit position adjustment of said bearing member relative to said reel body.

According to one preferred embodiment of the invention, an alignment construction for a rotary shaft of a fishing reel having a reel body, a rotary shaft, a bearing member fixed to the reel body for rotatably supporting the rotary shaft and a bearing-support barrel for supporting the bearing member to the reel body, wherein the bearing-support barrel includes an outer peripheral face and an inner peripheral face eccentric relative to the outer peripheral face to permit position adjustment of the bearing-support barrel relative to the reel body.

It is to be noted here that in this invention the rotary shaft is meant to generically refer to any of the rotatable shafts used the fishing reel such as the handle shaft and the spool shaft.

Functions and effects of the above constructions will be now described.

With either of the above constructions, if the axis of the handle shaft or the spool shaft is erroneously aligned with a shaft receiving hole defined in the reel body, this erroneous alignment can be readily corrected through the position adjusting function of the bearing member or of the bearing-support barrel, whereby the free rotation of the spool can always take plate smoothly. Further, with such smooth spool rotation, there occurs no problem of generation of uncomfortable gear rumbling noise, and also the correct and accurate shaft alignment without unnecessary gaps serves to prevent erroneous intrusion of a fishing line into the reel body when the line is taken up around the spool.

Further and other objects, features and effects of the invention will become more apparent from the following more detailed description of the embodiments of the invention with reference to the accompanying drawings.

BRIEF DESCRIPTION OF THE DRAWINGS

FIG. 3 is an enlarged front view of a bearing member used in the fishing reel, FIG. 4 is a vertical partial section of the bearing member of FIG. 3, FIG. 5 is a side view of a reel body of the fishing reel, FIG. 6 is a front view of a bearing-support barrel relating to a fishing reel of a further embodiment of the invention, and FIG. 7 is a vertical partial section of the bearing-support barrel of FIG. 6.

DESCRIPTION OF THE PREFERRED EMBODIMENTS

An alignment construction for a rotary shaft of a fishing reel relating to the invention will now be particularly described by way of preferred embodiments thereof with reference to the accompanying drawings.

Figure 1:
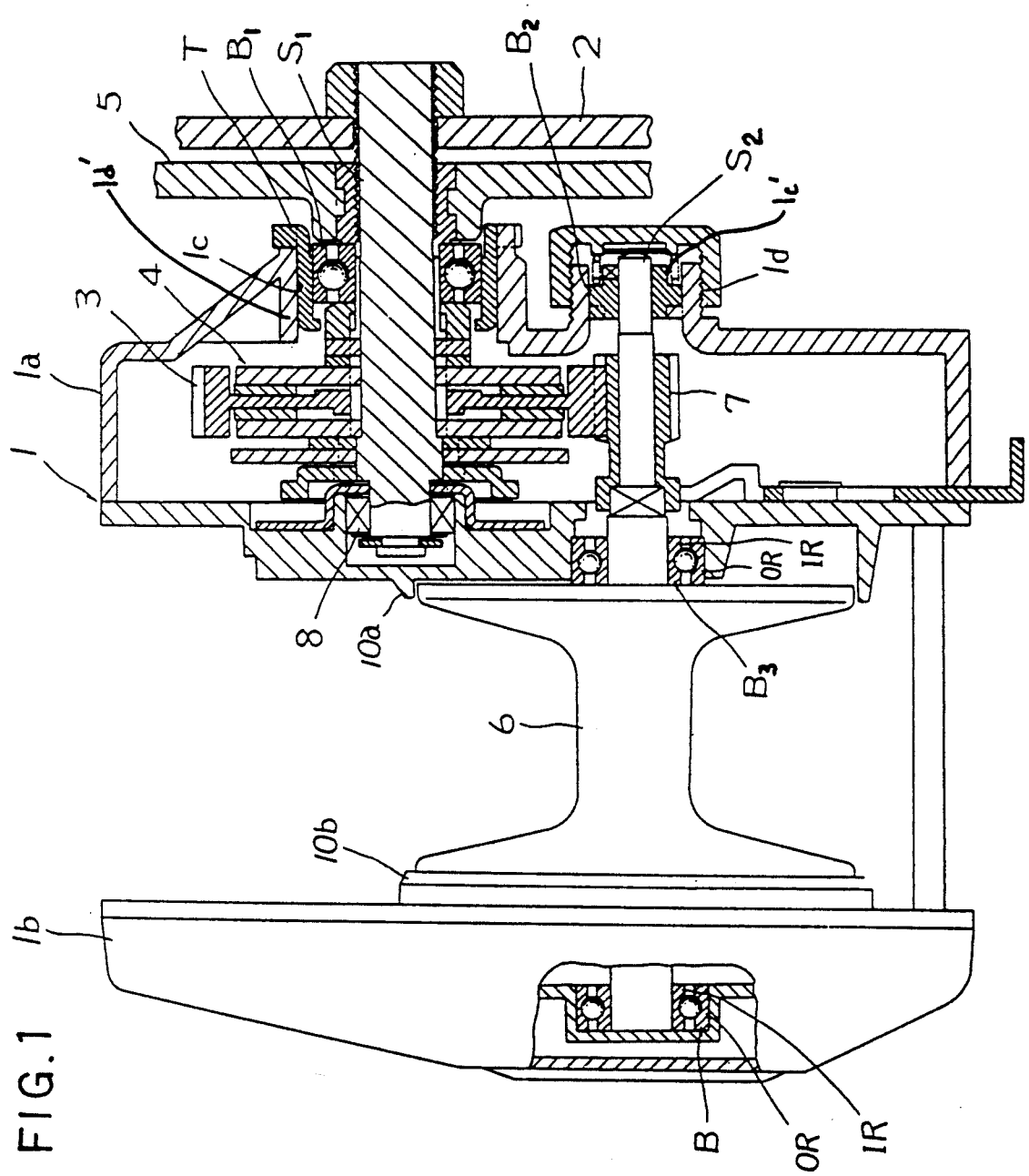
FIG. 1 is a partially cutaway front view showing an entire construction of a fishing reel relating to the present invention.

FIG. 1 shows an entire construction of a fishing reel. This fishing reel includes a reel body 1 having a first side frame 1a and a second side frame 1b, each side frame consisting of a combination of a side plate and a cover member. A horizontally extending handle shaft $S_1$ is rotatably supported through the first side frame 1a, with an outer extension of the shaft $S_1$ relative to the frame 1a mounting thereon a control handle 2. Further, inside the first side frame 1a, the handle shaft $S_1$ loosely mounts a main gear 3 across which a friction mechanism 4 is disposed. When the friction mechanism 4 is pushed with rotation of a control member 5 fitted on the handle shaft $S_1$ inwardly of the control handle 2, rotational force from the control handle 2 is transmitted via the handle shaft $S_1$ to the main gear 3.

Between the first and second side frames 1a and 1b, there is rotatably supported a spool shaft $S_2$ mounting thereon a spool 6. This spool shaft $S_2$ carries, inside the first side frame 1a, a pinion gear 7 meshable with the main gear 3, so that the rotational force of the handle shaft $S_1$ is transmitted via the main gear 3 and the pinion gear 7 to the spool shaft $S_2$.

The side plate of the side frames 1a and 1b respectively include side-opened, cylindrical portions 10a and 10b opposing to respective flanged peripheral end faces of the spool 6. These cylindrical portions 10a and 10b are, in cooperation with the flanged end faces of the spool 6, for preventing intrusion of a fishing line into the reel body 1 when the fishing line is taken up around the spool 6.

To rotatably support the handle shaft $S_1$, one end of this handle shaft $S_1$ is supported via a bearing member 8 to the side plate of the first side frame 1a. On the other hand, the first side frame 1a defines, in its outer side, a shaft receiving hole 1c into which a cylindrical, bearing-support barrel T is detachably inserted. And, between this support barrel T and the handle shaft $S_1$, there is interposed a ball bearing member $B_1$, whereby the ball bearing member $B_1$ and the bearing-support barrel T rotatably support an intermediate portion of the handle shaft $S_1$ relative to the cover member of the first side frame 1a.

To rotatably support the spool shaft $S_2$, further ball bearing members $B_3$, B are attached to the respective side plates of the first and second side frames 1a and 1b at opposed axial ends of the spool 6, whereby these ball bearing members $B_3$, B support both a distal end and an intermediate portion of the spool shaft $S_2$.

The cover member of the first side frame 1a includes a cylindrical portion 1d as an integral outward projection of this frame 1a. Inside this cylindrical portion 1d, there is formed a shaft support hole 1c' at which a further bearing member $B_2$ comprised of a bearing metal element is fitted, such that this further bearing member $B_2$ rotatably supports the other distal end of the spool shaft $S_2$.

Next, an aligning function of the above construction will be particularly described.

The aligning function can be achieved by a unique construction of the bearing members B, $B_1$, $B_2$, $B_3$ for rotatably supporting the handle shaft $S_1$ and the spool shaft $S_2$. That is, each of the bearing members B, $B_1$, $B_2$, $B_3$ includes an outer peripheral face and an inner peripheral face eccentric relative to the outer peripheral face so as to allow adjustment of peripheral position of the bearing member relative to the reel body 1. Consequently, when one of the rotary shaft $S_1$ or $S_2$ is erroneously aligned with a respective shaft receiving hole of the reel body 1, this error can be readily corrected with the adjustment of peripheral position of the associated bearing member relative to the reel body 1.

Figure 2:
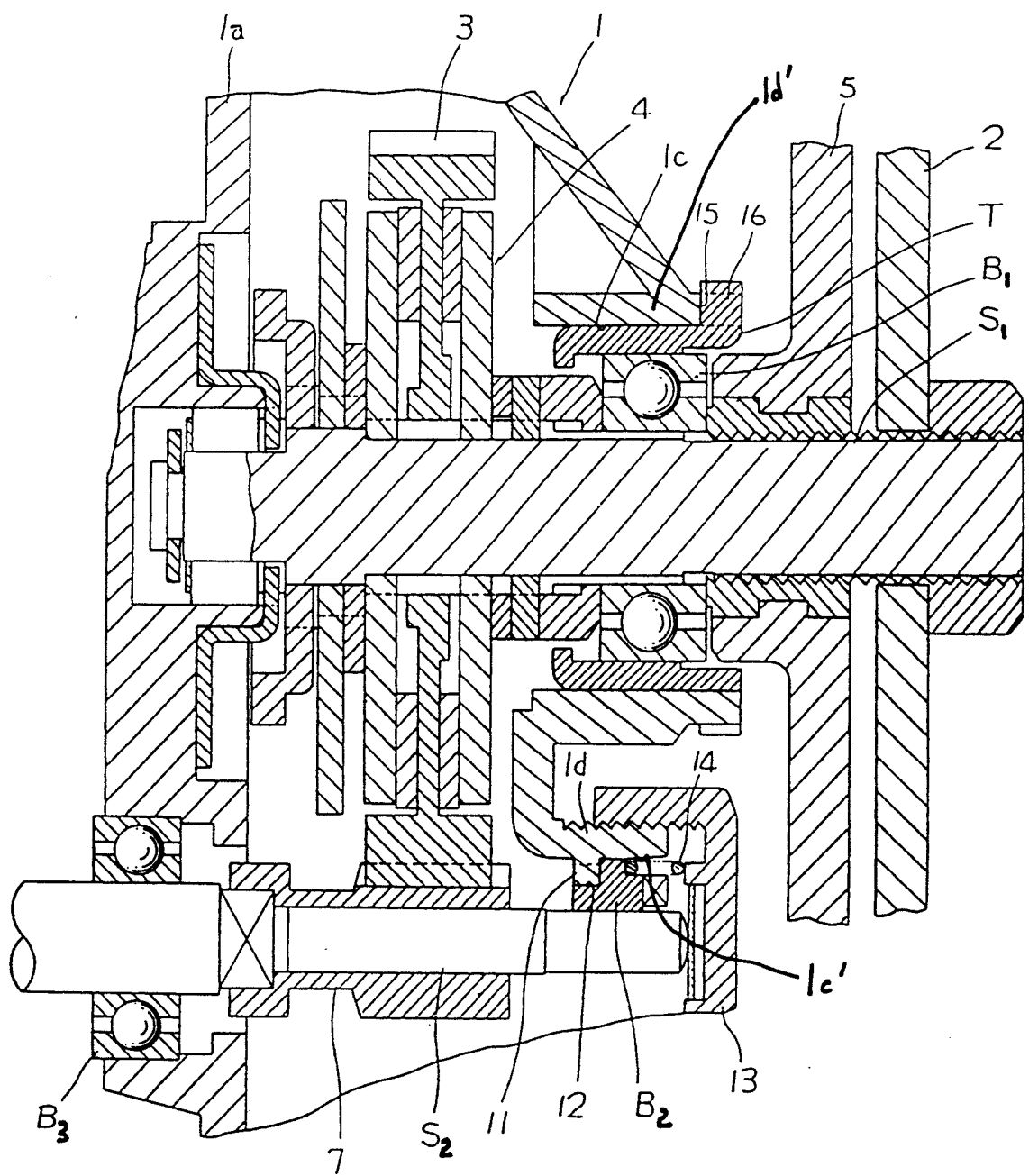
FIG. 2 is a section view showing major portions of the construction of FIG. 1 in a larger scale.

Specifically, in the case of the bearing member $B_2$ for supporting the one distal end of the spool shaft $S_2$, as shown in FIGS. 2 through 4, its inner peripheral face b is formed eccentric relative to its outer peripheral face a. Describing differently, the outer peripheral face a has an axis $G_1$ which is eccentric relative to an axis $G_2$ of the inner peripheral face b. Thus constructed bearing member $B_2$ is fitted in the cylindrical portion 1d integrally projecting from the cover member of the first side frame 1a. The cylindrical portion 1d forms therein, within hole 1c' a plurality of peripheral projections 11 spaced apart with a predetermined distance therebetween. Whereas, the bearing member $B_2$ forms, in its outer periphery, a plurality of engaging grooves 12 selectably engageable with the respective projections 11 of the cylindrical portion 1d. With this, as the bearing member $B_2$ is rotated relative to the cylindrical portion 1d, the engaging position between the projections 11 and the grooves 12 varies accordingly, whereby the axis of the spool shaft $S_2$ on the side for supporting the pinion gear can be aligned relative to the center of the shaft receiving hole of the cylindrical portion 1d.

The outer face of the bearing member $B_2$, as shown in FIG. 3, carries numerical marks "1" through "4" provided with 90 degrees distance therebetween for indicating angular positions of the bearing member $B_2$. Further, at a middle position between each adjacent pair of the numerical marks, there is provided a notched mark c. Thus, with using one of the numerical marks as a reference position, the alignment operation of the spool shaft $S_2$ can be carried out easily yet accurately by rotating the bearing member $B_2$ relative to the cylindrical portion 1d.

Further, at a position carrying one of the numerical marks, there is formed a recess d for facilitating attachment and detachment of the bearing member $B_2$ to and from the cylindrical portion 1d.

A cover 13 is fitted over the cylindrical portion 1d, and a coil spring 14 is interposed between this cover 13 and the bearing member $B_2$. Then, as the cover 13 is screwed outwardly, the urging force of the spring 14 can effectively maintain the selected engagement between the projection 11 and the engaging groove 12. For aligning the spool shaft $S_2$, first, the control member 5 is axially moved toward the control handle 2 by its rotation about shaft $S_1$ and due to the screw-coupling between it and shaft $S_1$. Second, the cover 13 is removed and also the bearing member $B_2$ is axially moved to the right in FIG. 2. In this condition, the rotational adjustment of the bearing member $B_2$ inside the cylindrical portion 1d can be effected.

A similar alignment construction is provided between the handle shaft $S_1$ and the reel body 1. As described hereinbefore, the shaft receiving hole 1c defined in the cover member of the first side frame 1a of the reel body 1 supports the bearing $B_1$ via the bearing-support barrel T, so that the bearing $B_1$ rotatably supports the handle shaft $S_1$. Then, in this case, the bearing-support barrel T, instead of the bearing $B_1$, includes an eccentric pair of inner and outer peripheral faces so as to allow adjustment of peripheral position of the bearing-support barrel T relative to the shaft receiving hole 1c of the first side frame 1a.

More particularly, as shown in FIGS. 5 through 7, the bearing-support barrel T includes the outer peripheral face e and the inner peripheral face f eccentric relative to the outer peripheral face e. That is, the outer peripheral face e and the inner peripheral face f have axes $G_3$ and $G_4$ eccentric relative to each other. Thus constructed bearing-support barrel T is fitted at the shaft receiving hole 1c defined by a cylindrical part 1d" of in the first side frame 1a. The shaft receiving hole 1c forms a plurality of peripheral engaging grooves 15 spaced apart with a predetermined distance therebetween. Whereas, the bearing-support barrel T forms, in its outer periphery, a plurality of radial projections 16 engageable with the engaging grooves 15 of the shaft receiving hole 1c. With this, as the support barrel T is rotated relative to the shaft receiving hole 1c, the engaging position between the grooves 15 and the projections 16 varies accordingly, whereby the axis of the handle shaft $S_1$ can be aligned relative to the center of the shaft receiving hole 1c.

As shown in FIG. 6, the projections 16 of the bearing-support barrel T respectively carry, on outer faces thereof, numerical marks "2" through "8" which indicate angular positions of the support barrel T. Then, an alignment operation of the handle shaft $S_1$ takes place by rotating the bearing-support barrel T relative to the shaft receiving hole 1c while using these marks as reference. For this alignment operation of the handle shaft $S_1$, similarly to that of the spool shaft $S_2$, the control member 5 is axially moved toward the control handle 2 by its rotation about shaft $S_1$ and through the screw-coupling between them; and the bearing-support barrel T is pulled outwards. In this condition, the support barrel T is rotatably adjusted within the shaft receiving hole 1c.

A similar alignment construction can be optionally provided between the side frames 1a, 1b and the spool shaft $S_2$ supported to the side frames 1a, 1b via the ball bearing members B and $B_3$. That is, the ball bearing member $B_3$ on the side of the first side frame 1a or B of the second side frame 1b includes an outer race OR and an inner race IR eccentric relative to each other. So that, when the axis of the spool shaft $S_2$ is erroneously aligned with the rotationwise center of the reel body 1, the error can be readily corrected by rotating the bearing member B, $B_3$ relative to the reel body 1.

The above-described alignment construction at these positions are advantageous particularly for preventing inadvertent intrusion of the fishing reel into the reel body 1 when the fishing line is being taken up around the spool 6. That is, if the spool shaft $S_2$ is improperly aligned relative to the centers of the cylindrical portions 10a and 10b of the side frames 1a and 1b, there are created gaps between the spool 6 and the side frames 1a and 1b, through which gaps the taken-up fishing line can enter the reel body 1 and become entangled with the mechanism therein. Thus, with the proper alignment of the spool shaft $S_2$ at the above positions can advantageously eliminate the gaps and prevent such problem.

Needless to say, the proper alignment of the spool shaft $S_2$ can assure more reliable meshing engagement between the pinion gear 7 and the main gear 3, thereby to almost entirely prevent the problem of unsmooth and noise-generating spool rotation.

In the foregoing embodiment, the ball bearing type bearing members $B_1$, $B_2$, $B_3$ are used for rotatably supporting the handle shaft $S_1$ and also for supporting the one distal end and the intermediate positions of the spool shaft $S_2$. These bearing members can alternatively comprise bearing metal elements formed of synthetic resin material or ceramic material or the like.

Similarly, in the foregoing embodiment, the bearing metal element type bearing member B is employed for rotatably supporting the other distal end of the spool shaft $S_2$. This bearing member B can be of the ball bearing type instead. That is, in working the present invention, the specific types of the bearing members are not limited to those disclosed in the embodiment but can vary in accordance with the convenience.

The invention may be embodied in other specific forms without departing from the spirit or essential characteristics thereof. The present embodiments are therefore to be considered in all respectes as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:
a reel body,
a spool rotatably supported to said reel body through a spool shaft,
a handle for rotating a handle shaft,
a drive mechanism for driving said spool shaft upon rotation of said handle shaft, and
bearing members supported by the reel body for rotatably supporting said handle shaft and spool shaft, at least one of said bearing members including an outer peripheral face and an inner peripheral face eccentric relative to said outer peripheral face to permit position adjustment of the shaft supported by said at least one bearing member upon the rotation of said at least one bearing member relative to said reel body, said reel body including a tubular portion having an inner surface defining a first engaging portion that engages with a second engaging portion provided on said at least one bearing member said first and second engaging portions comprising means for preventing relative rotation between said at least one bearing member and said reel body when said fishing reel is in use, said engaging portions being disengageable to permit said at least one bearing member to be rotated relative to said reel body to permit said position adjustment.

2. A fishing reel as in claim 1, wherein said at least one bearing member is fitted in said tubular portion, said first engaging portion of said tubular portion comprising a plurality of projections therein, said second engaging portion comprising a plurality of engaging grooves engageable with said projections.

3. A fishing reel comprising:
a reel body,
a spool rotatably supported to said reel body through a spool shaft,
a handle for rotating a handle shaft,
a drive mechanism for driving said spool shaft upon rotation of said handle shaft,
bearing members for rotatably supporting said spool shaft and handle shaft, and
a bearing-support barrel for supporting at least one of the bearing members to the reel body, said bearing-support barrel including an outer peripheral face and an inner peripheral face eccentric relative to said outer peripheral face to permit position adjustment of the shaft supported by said at least one bearing member upon rotation of said bearing-support barrel relative to said reel body, said reel body including an opening provided on a handle side of said reel for receiving said bearing support barrel, said opening having an inner surface containing a first engaging portion that engages with a second engaging portion provided on an outer peripheral surface of said bearing support barrel, said first and second engaging portions comprising means for preventing relative rotation between said bearing support barrel and said reel body when said fishing reel is in use, said engaging portions being disengageable to permit said bearing support barrel to be rotated relative to said reel body to permit said position adjustment.

4. A fishing reel as in claim 3, wherein said opening is formed by a cylindrical portion of a side frame of said reel body, said first engaging portion of said inner surface comprising a plurality of projections, said second engaging portion of said bearing-support barrel including a plurality of engaging grooves engageable with said projections.

* * * * *